(12) United States Patent
Sobel

(10) Patent No.: US 7,739,341 B1
(45) Date of Patent: *Jun. 15, 2010

(54) SYSTEM UTILIZING UPDATED SPAM SIGNATURES FOR PERFORMING SECONDARY SIGNATURE-BASED ANALYSIS OF A HELD E-MAIL TO IMPROVE SPAM EMAIL DETECTION

(75) Inventor: William E Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 11/865,070

(22) Filed: Sep. 30, 2007

Related U.S. Application Data

(63) Continuation of application No. 10/455,014, filed on Jun. 4, 2003, now Pat. No. 7,293,063.

(51) Int. Cl.
*G06F 15/16* (2006.01)
(52) U.S. Cl. .................. 709/206; 709/207; 726/23; 726/24
(58) Field of Classification Search .................. 709/206, 709/207; 726/23, 24; 713/200, 201
See application file for complete search history.

(56) References Cited

U.S. PATENT DOCUMENTS

| 6,330,590 | B1* | 12/2001 | Cotten ........................ 709/206 |
| 6,654,787 | B1* | 11/2003 | Aronson et al. ............. 709/206 |
| 6,691,156 | B1* | 2/2004 | Drummond et al. ......... 709/206 |
| 6,732,149 | B1* | 5/2004 | Kephart ...................... 709/206 |
| 2002/0162025 | A1* | 10/2002 | Sutton et al. ................ 713/201 |
| 2004/0117648 | A1* | 6/2004 | Kissel .......................... 713/200 |
| 2004/0167968 | A1* | 8/2004 | Wilson et al. ............... 709/207 |

* cited by examiner

*Primary Examiner*—Le Luu
(74) *Attorney, Agent, or Firm*—Fenwick & West LLP

(57) ABSTRACT

A spam manager (101) receives (201) at least one e-mail (106) addressed to a domain (103). The spam manager (101) performs (203) a signature based analysis of received e-mail (106) to determine whether received e-mail (106) includes at least one signature indicative of spam. Responsive to the spam manager (101) identifying e-mail (106) that does not include at least one signature indicative of spam and to a timeout period not having transpired from a time of receipt of the e-mail (106) by the spam manager (101), the spam manager (101) performs (205) at least one secondary analysis of the identified e-mail (106).

15 Claims, 13 Drawing Sheets

SYSTEM UTILIZING UPDATED SPAM SIGNATURES FOR PERFORMING SECONDARY SIGNATURE-BASED ANALYSIS OF A HELD E-MAIL TO IMPROVE SPAM EMAIL DETECTION

CROSS REFERENCE TO RELATED APPLICATIONS

This application is a continuation of U.S. application Ser. No. 10/455,014, filed Jun. 4, 2003, now U.S. Pat. No. 7,293,063 which is incorporated by reference in its entirety.

BACKGROUND

This invention pertains to detecting spam e-mail.

Spam e-mail is a significant and growing nuisance. As used herein, "spam" is any e-mail that is sent to a computer user without the user's consent.

One known method of detecting spam is by performing a signature based analysis of e-mail. Spam e-mail can often be identified with a signature. A signature is some feature that occurs in a specific sample but is unlikely to occur in other samples in a given population. Signature analysis can consider a whole e-mail message at once, specific ranges of bytes within the message, the presence or absence of certain fields anywhere within the message or within certain byte ranges, etc. A signature can be represented as a hash of all, or of certain portions of a message. Statistical methods such as information gain can be used to extract significant features that distinguish one sample population from another.

An example signature might be a specific subject line, such as "Lose Weight While You Sleep!" Another example signature might attempt to catch a whole class of spam messages by looking for the presence of a phone number or URL used in a set of spam messages. Spam senders often change the content or layout of a message, but they usually want the recipient to do something that involves calling a phone number or visiting a particular web page; these items can make for good signature targets. Many other types and examples of signature targets are known to those of ordinary skill in the relevant art. Likewise, various possible signature analysis optimizations are known.

Because of the sheer volume of spam and the use of obfuscation techniques, producing antispam signatures can be complex. Sophisticated back-end infrastructures called spam traps that gather spam and automatically analyze the spam to extract good signatures are often used to create a viable, accurate, and up-to-date signature set. Once a spam trap identifies new signatures, the spam trap can provide them to a signature analysis based spam detection system. Because it takes time for a trap manager to identify new signatures and make them available to a spam detection system, there is often a delay before detection systems can effectively detect spam containing these new signatures. Thus, detection systems can either process e-mail upon receipt, without access to the latest signatures, or hold received e-mail for a period of time in order to wait for the receipt of new signatures, thereby causing a processing delay.

Another known methodology for spam detection involves the use of neural networks and similar machine learning techniques (e.g., Bayesian networks, support vector machines). Machine learning systems are sometimes trained to recognize spam and legitimate e-mail. These approaches require that the network be trained against both spam and non-spam. The training steps involve analyzing words that occur in samples and their frequency of occurrence. Words that are common to both sample sets are eliminated, and a list of words common to spam and a list of words common to non-spam is left. Using the word list common to spam and the spam sample set, the network is trained to recognize spam. Similarly, using the word list common to non-spam and the non-spam sample set, the network is trained to recognize non-spam. The result is a network which, given a sample, outputs a number that represents the likelihood of the message being spam. The component is configured to consider samples with a value over a given threshold as spam.

When using neural networks to detect spam, there is always a tradeoff between detection and false positive rates. If the neural network is configured to identify spam aggressively, the neural network will generally incorrectly identify a certain number of legitimate e-mails as spam. On the other hand, if the neural network is configured to minimize false positives, it will typically allow a certain number of false negatives as well.

What is needed are methods, computer readable media and systems that allow spam detection with the accuracy of signature based analysis, without the latency inherent therein, and without the tradeoff between false positives and accuracy inherent in machine learning system detection.

SUMMARY

The present invention comprises methods, systems, and computer readable media for detecting spam e-mail. A spam manager (101) receives (201) at least one e-mail (106) addressed to a domain (103). The spam manager (101) performs (203) a signature based analysis of received e-mail (106) to determine whether received e-mail (106) includes at least one signature indicative of spam. Responsive to the spam manager (101) identifying e-mail (106) that does not include at least one signature indicative of spam and to a timeout period not having transpired from a time of receipt of the e-mail (106) by the spam manager (101), the spam manager (101) performs (205) at least one secondary analysis of the identified e-mail (106).

The features and advantages described in this summary and in the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
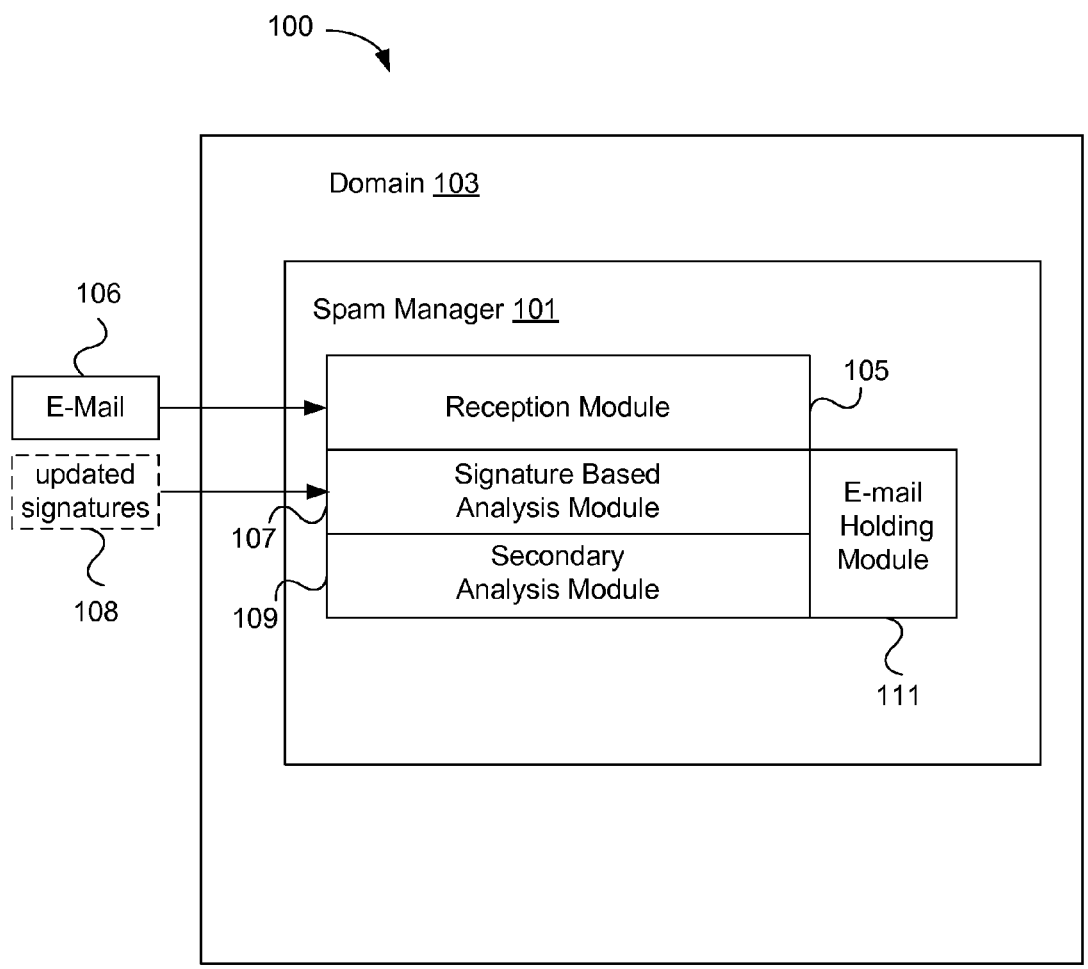
FIG. 1 is a block diagram illustrating a high level overview of one embodiment of the present invention.

FIG. 1 is a block diagram illustrating a high level overview of a system 100 for performing one embodiment of the present invention. As illustrated in FIG. 1, a spam manager 101 runs in a domain 103. It is to be understood that although the spam manager 101 is illustrated as a single entity, as the term is used herein a spam manager 101 refers to a collection of functionalities which can be implemented as software, hardware, firmware or any combination of the three. Where a spam manager 101 is implemented as software, it can be implemented as a standalone program, but can also be implemented in other ways, for example as part of a larger program, as a plurality of separate programs, or as one or more statically or dynamically linked libraries. In some embodiments the spam manager 101 is implemented as a software program which can run on an e-mail 106 server (or other computer such as a gateway) within a given domain 103. In other embodiments, the functionalities performed by the spam manager 101 are distributed between multiple computers within the domain 101. In some embodiments, at least one step is performed by a server, gateway and/or client computer.

The spam manager 101 illustrated in FIG. 1 includes a reception module 105 for receiving e-mail 106, a signature based analysis module 107 for performing signature based spam detection (and for receiving updated signatures 108), a secondary analysis module 109 for performing secondary spam detection and an e-mail 106 holding module 111, for holding e-mail 106 of undetermined status. These modules are illustrated as being discrete entries, but, as with the spam manager 101 itself, comprise functionalities which can be implemented in a variety of ways as desired. The performance of these functionalities is described in more detail below.

Figure 2:
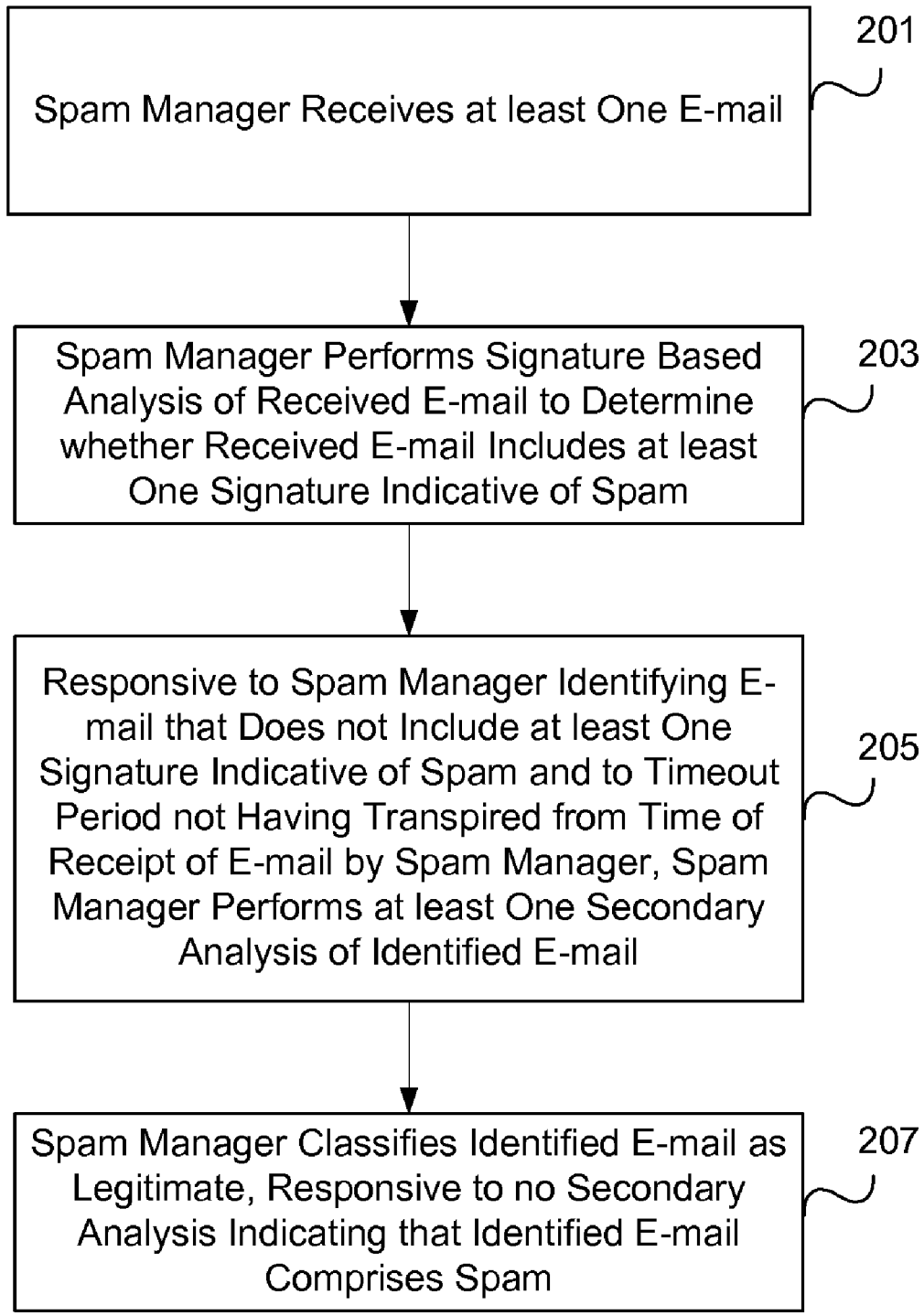
FIG. 2 is a flowchart illustrating steps for performing one embodiment of the present invention.

FIG. 2 illustrates steps for practicing one embodiment of the present invention. The spam manager 101 receives 201 at least one e-mail 106 addressed to the domain 103. The spam manager 101 proceeds to perform 203 signature based analysis of received e-mail 106 to determine whether received e-mail 106 includes at least one signature indicative of spam. The implementation mechanics of performing signature based analysis of e-mail 106 are known to those of ordinary skill in the relevant art. As will be apparent to ordinarily skilled artisans, many variations are possible for performing the signature based analysis. For example, there are many possible optimizations for signature based schemes. Because senders of spam typically send many messages, and because they want people to read what they send, most spam messages come in a relatively narrow band of small sizes. In addition, many spam messages have disclaimers, opt-out instructions, phone numbers, URLs, etc. near the very top or very bottom of the message. While there are many more possible optimizations, it is worth noting that these and other observations can be used for optimization of signature scanning.

Spam producers often attempt to make detection nontrivial. One common obfuscation technique for spam is base-64 or other encoding of the body (even when it is unnecessary). Most e-mail clients support HTML mail, which further increases the number of ways e-mail 106 can be encoded (e.g., HTML spam can use JavaScript to decode what otherwise seems to be random characters in the raw text of a message). In addition, the spam producer can rotate through various encoding schemes such that a single spam message is sent out with several different encodings (or even use multiple schemes within a single message). A signature based analysis can increase its effectiveness by un-encoding e-mail 106 into a canonical format before looking for signatures.

Recently spammers have begun to support some level of customization of generated e-mail 106; for example, attempting to extract the recipient's name and using that to customize the message. A straight comparison between two such messages now fails even though the content is 99.99% identical. However, a signature based analysis can take this technique into account as well.

Spam producers can also increase the difficulty of signature detection by adding random character strings to various portions of the message. The most common such technique is to append a random number of spaces and then a random character string to the end of the subject line of the message. Thus, the subject line itself is often different for different copies of the same spam. Therefore, the signature based analysis can benefit from looking for such random character strings.

Returning to FIG. 2, in some instances the signature based analysis identifies e-mail 106 that does not include any signatures indicative of spam. In other words, the signature based analysis indicates that the e-mail 106 is legitimate. How such e-mail 106 is processed depends upon how much time has transpired since the e-mail 106 was received. The signature based analysis module 107 receives updated signatures 108 from time to time, as discussed in more detail below. If a specified timeout period has not yet transpired since receipt of the e-mail 106 by the spam manager 101, the spam manager 101 cannot assume that it has received sufficiently new signatures in order to perform a robust signature based analysis of the e-mail 106. In that case, even where the signature based analysis does not unearth suspicious signatures, the spam manager 101 performs 205 at least one secondary analysis of the e-mail 106, in order to clarify whether the e-mail 106 is spam. It is to be understood that the length of the specified timeout period is a variable design choice, which can be set to a desired value, for example by an administrator of the spam manager 101. As will be readily apparent to those of ordinary skill in the relevant art, longer defined timeout periods will result in more robust associated signature based analysis. However, the price of the more robust signature based analysis will be longer processing times, when it is necessary to hold e-mail 106 during the timeout period.

In many embodiments, the secondary analysis comprises a neural network analysis, or a similar machine learning analysis such as a Bayesian network analysis. The implementation mechanics for detecting spam through machine learning analysis of e-mail 106 is known to those of ordinary skill in the art.

It will be readily apparent to those of ordinary skill in the relevant art that in other embodiments, other forms of secondary analysis can be employed, such as a real-time black hole list analysis. Using real-time black hole list analysis to detect spam is known to those of ordinary skill in the art. Real-time black hole list analysis leverages the fact that the sender's return address is often spoofed in spam messages. The sender's return address is usually non-existent or, if real to begin with, abandoned once the mail is sent, so the return address is a poor candidate for signatures. However, the address of the mail transfer agent (MTA) that delivers the spam can often be discerned; that's where real-time black hole lists (RBLs) come in.

Real-time black hole lists provide categorization of a remote Internet Protocol (IP) address. The categories supported depend on the RBL vendor, but generally contain categories such as 'known spammer', 'open relay' and 'dialup/DSL/cable user.'

These lists can change in real time and are designed to be queried as messages are processed. Current implementations typically use a Domain Name System interface to return the categories encoded as an IP address. When a mail server receives a connection, the connecting MTA's address can be checked against one or more RBLs; if the connecting MTA's address is categorized as an unwanted mailer (e.g. 'known spammer'), then the mail server can refuse the connection (by dropping it, returning an error, etc.). Most modern mail server products have built in support for RBL checks, but it is also easy to add RBL support by creating a Simple Mail Transfer Protocol proxy that performs RBL checks regardless of whether or not the destination e-mail 106 server has RBL support.

In other embodiments, more than one secondary analysis can be performed, as desired. If none of the secondary analyses indicate that the e-mail 106 is spam, the spam manager 101 classifies 207 the e-mail 106 as legitimate. Although the signature based analysis did not necessarily utilize the most recent signatures, the spam manager 101 can safely classify 207 the e-mail 106 as being legitimate because the signature based analysis was supplemented by the secondary analysis. Note that this embodiment uses the secondary analysis to avoid the latency inherent in prior art signature based analysis.

The implementation mechanics of a signature based analysis module 107 receiving updated signatures 108 from time to time are known to those of ordinary skill in the relevant art. As those of ordinary skill know, spam traps can create updated signatures 108 and supply them to a signature based analysis module 107 as they become available. Spam traps are basically spam collectors. E-mail 106 addresses are created and then made available to sources known to be harvested by spammers. Spammers harvest addresses in a number of ways. "Scavenger bots" gather e-mail 106 addresses from Usenet groups, newsgroups, chat rooms, user directories, mail-to links on web pages, and many other locations. If the recipient of a spam message follows the ubiquitous removal instructions, they will usually just end up posting their e-mail 106 address to a web form or mail-bot that will update a list of "live" addresses. Such lists are bought and sold by spammers, and lists that have some indication that the address is "live" are worth more in such commerce. By seeding the spam fields with spam traps, a sensor network can be sure to have their traps harvested. If properly seeded, the spam traps will be guaranteed to receive only spam, and that makes the set of mail received by such traps a pristine corpus of spam samples. The spam traps can provide updated signatures 108 to the spam manager 101 as they are identified.

Figure 3:
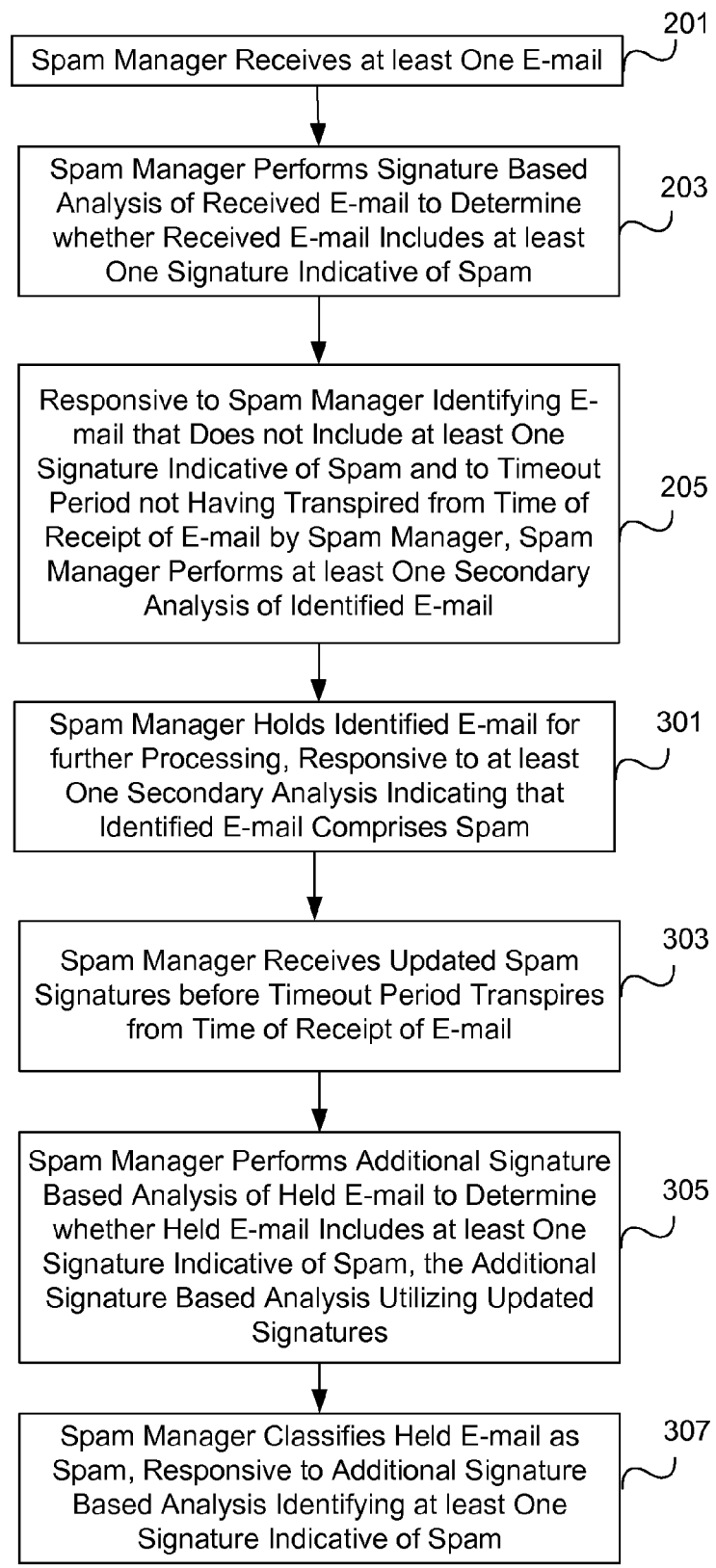
FIG. 3 is a flowchart illustrating steps for performing one embodiment of the present invention in which a secondary analysis indicates that e-mail comprises spam.

FIG. 3 illustrates steps for performing one embodiment of the present invention in which a secondary analysis indicates that e-mail 106 comprises spam. As with the embodiment illustrated in FIG. 2, the spam manager 101 receives 201 e-mail 106, and performs 203 a signature based analysis thereon. Prior to the expiration of the timeout period, the signature based analysis identifies e-mail 106 without any signatures indicative of spam. In response, the spam manager 101 performs 205 at least one secondary analysis of the identified e-mail 106.

Responsive a secondary analysis indicating that the identified e-mail 106 comprises spam, the spam manager 101 holds 301 the identified e-mail 106 for further processing. In this instance, the signature based analysis indicated the e-mail 106 is legitimate, but the secondary analysis indicated that the e-mail 106 comprises spam. Recall that signature based analysis is generally accurate, but this accuracy requires current signatures. Because the timeout period has not expired, the spam manager 101 cannot assume that the latest signatures were available for the signature based analysis. Although the secondary analysis identified the e-mail 106 as spam, many of the secondary analysis techniques (e.g. neural network analysis) can have high false positive rates. It is for these reasons that the spam manager 101 holds 301 the e-mail 106, to see if updated signatures 108 will arrive before the expiration of the timeout period.

In the embodiment illustrated in FIG. 3, the spam manager 101 receives 303 updated signatures 108 before the timeout period transpires. The spam manager 101 proceeds to perform 305 an additional signature based analysis of the identified e-mail 106 utilizing the updated signatures 108.

The next step depends upon the result of the additional signature based analysis. In the embodiment illustrated in FIG. 3, the additional signature based analysis identifies a signature indicative of spam within the e-mail 106, and in response to this identification classifies the e-mail 106 as spam. Although the initial signature based analysis did not detect signatures within the e-mail 106 indicative of spam, the initial signature based analysis was performed without the updated signatures 108. The spam manager 101 held 301 the e-mail 106 because of the identification of the e-mail 106 as spam by the secondary analysis. The result of the secondary analysis, although not enough to classify the e-mail 106 as spam by itself because of the false positive problems associated with secondary analysis techniques, justifies the time delay associated with holding 301 the e-mail 106. Note that the majority of e-mail 106 not identified as spam by the initial signature based analysis will likely not be identified as spam by the secondary analysis either, and thus will not cause such a time delay.

Figure 4:
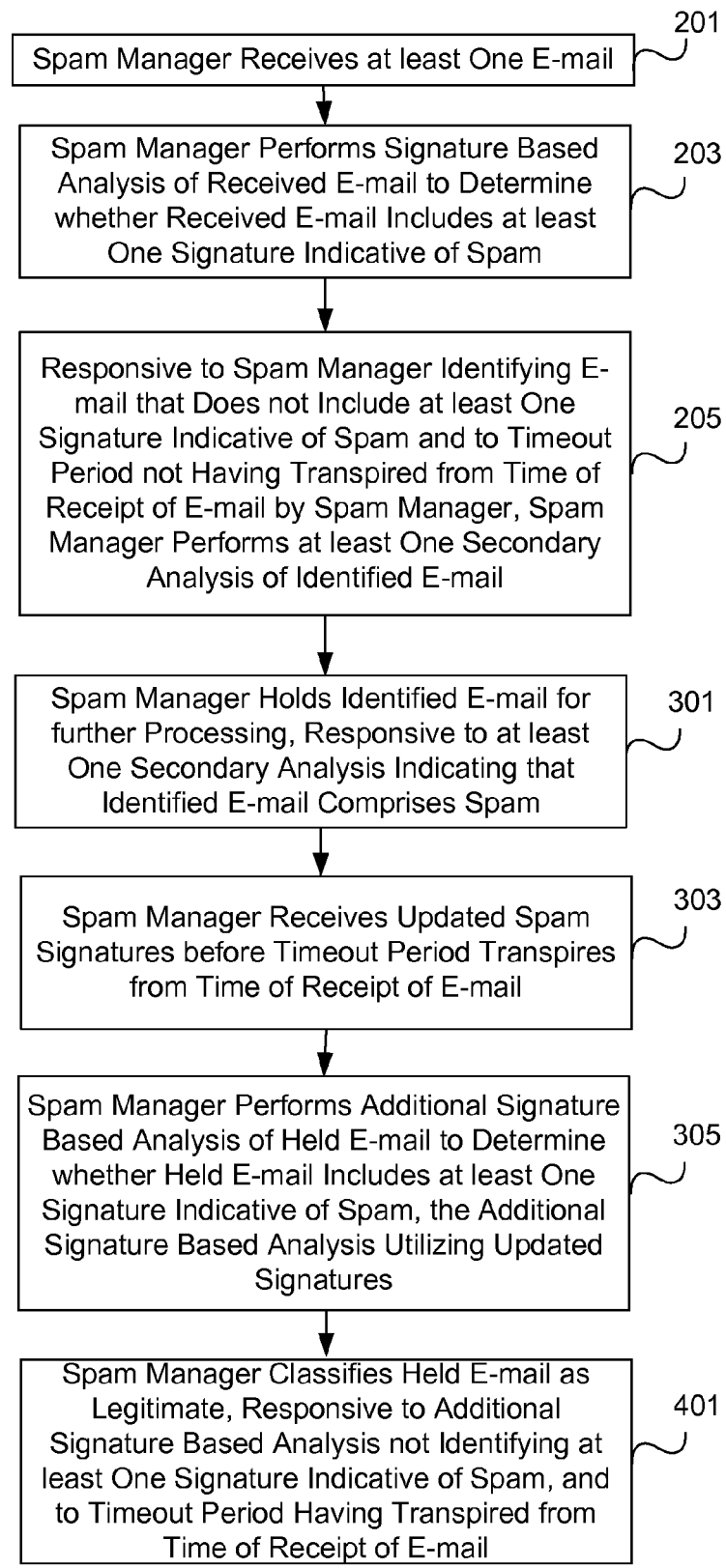
FIG. 4 is a flowchart illustrating steps for performing one embodiment of the present invention in which additional signature based analysis does not identify any signatures indicative of spam within an e-mail.
Figure 5:
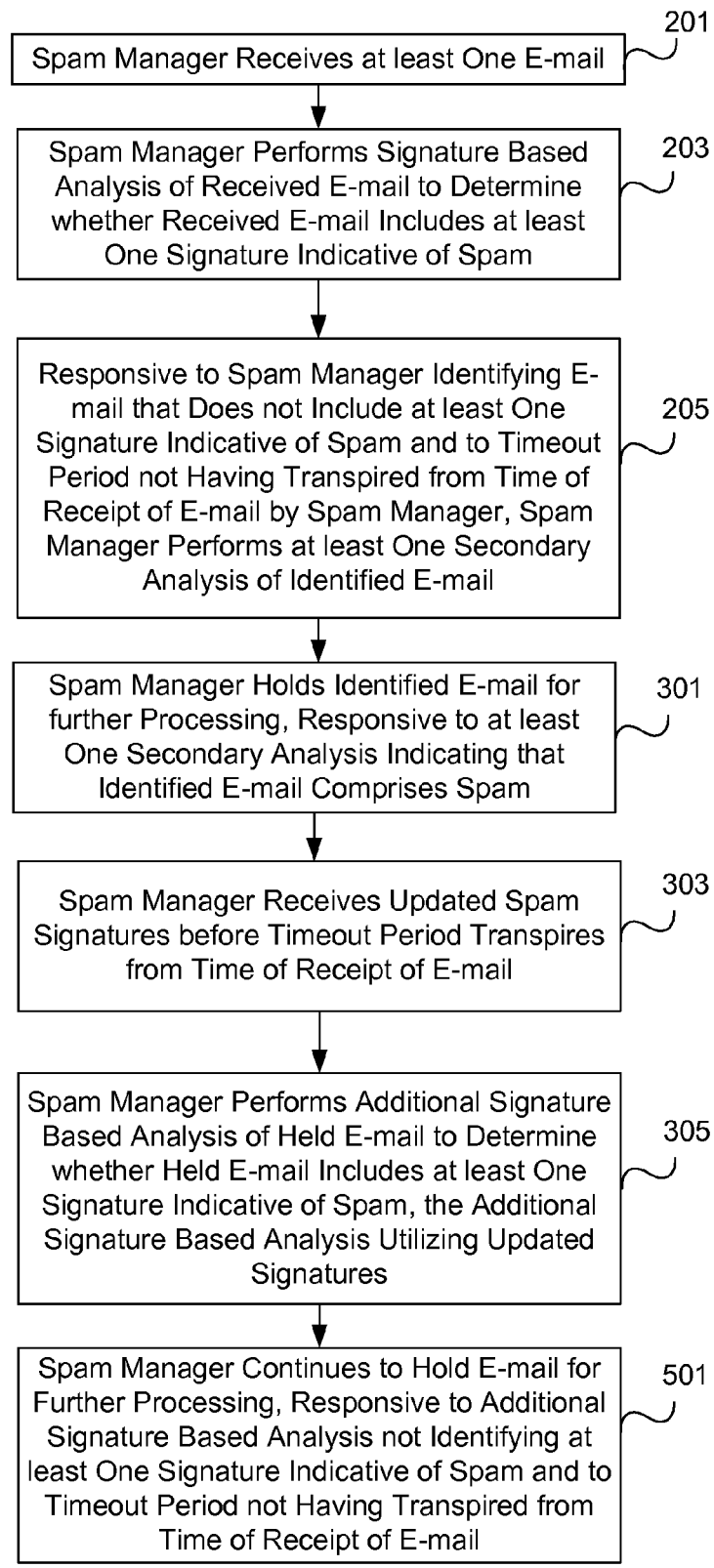
FIG. 5 is a flowchart illustrating steps for performing another embodiment of the present invention in which additional signature based analysis does not identify any signatures indicative of spam within an e-mail.

FIGS. 4-5 illustrate steps for performing other embodiments of the present invention, in which, as in the embodiment illustrated in FIG. 3, the signature based analysis identifies the e-mail 106 as legitimate, the secondary analysis indicates that the e-mail 106 is spam, and the spam manager 101 receives 303 updated signatures 108 before the expiration of the timeout period and performs 305 an additional signature based analysis.

As with the embodiment of FIG. 3, the spam manager 101 receives 201 e-mail 106, and performs 203 a signature based analysis thereon. Prior to the expiration of the timeout period, the signature based analysis identifies e-mail 106 without any signatures indicative of spam. In response, the spam manager 101 performs 205 at least one secondary analysis of the identified e-mail 106. Responsive to a secondary analysis indicating that the identified e-mail 106 comprises spam, the spam manager 101 holds 301 the identified e-mail 106 for further processing. The spam manager 101 receives 303 updated signatures 108 before the timeout period transpires, and performs 305 an additional signature based analysis of the e-mail 106, utilizing the updated signatures 108.

In both the embodiments illustrated in FIGS. 4 and 5, the additional signature based analysis does not identify any signatures indicative of spam within the e-mail 106. The response depends upon whether the timeout period has transpired. As illustrated in FIG. 4, in that embodiment, responsive to the timeout period having transpired and the additional signature based analysis not identifying any signatures indicative of spam within the e-mail 106, the spam manager 101 classifies 401 the e-mail 106 as legitimate. Because of the expiration of the time period, it can be assumed that the additional signature based analysis utilized the latest signatures, yet the additional signature based analysis still classified the e-mail 106 as legitimate. Although the secondary analysis classified the e-mail 106 as spam, because of the false positive issues associated with secondary analysis techniques, the spam manager 101 relies on signature based analysis utilizing the latest signatures over the secondary analysis, and classifies 401 the e-mail 106 as legitimate.

In the embodiment illustrated in FIG. 5, the timeout period has not transpired. Therefore, the spam manager 101 cannot assume that the additional secondary analysis utilized the latest signatures, and in response continues 501 to hold the e-mail 106 for further processing.

Figure 6:
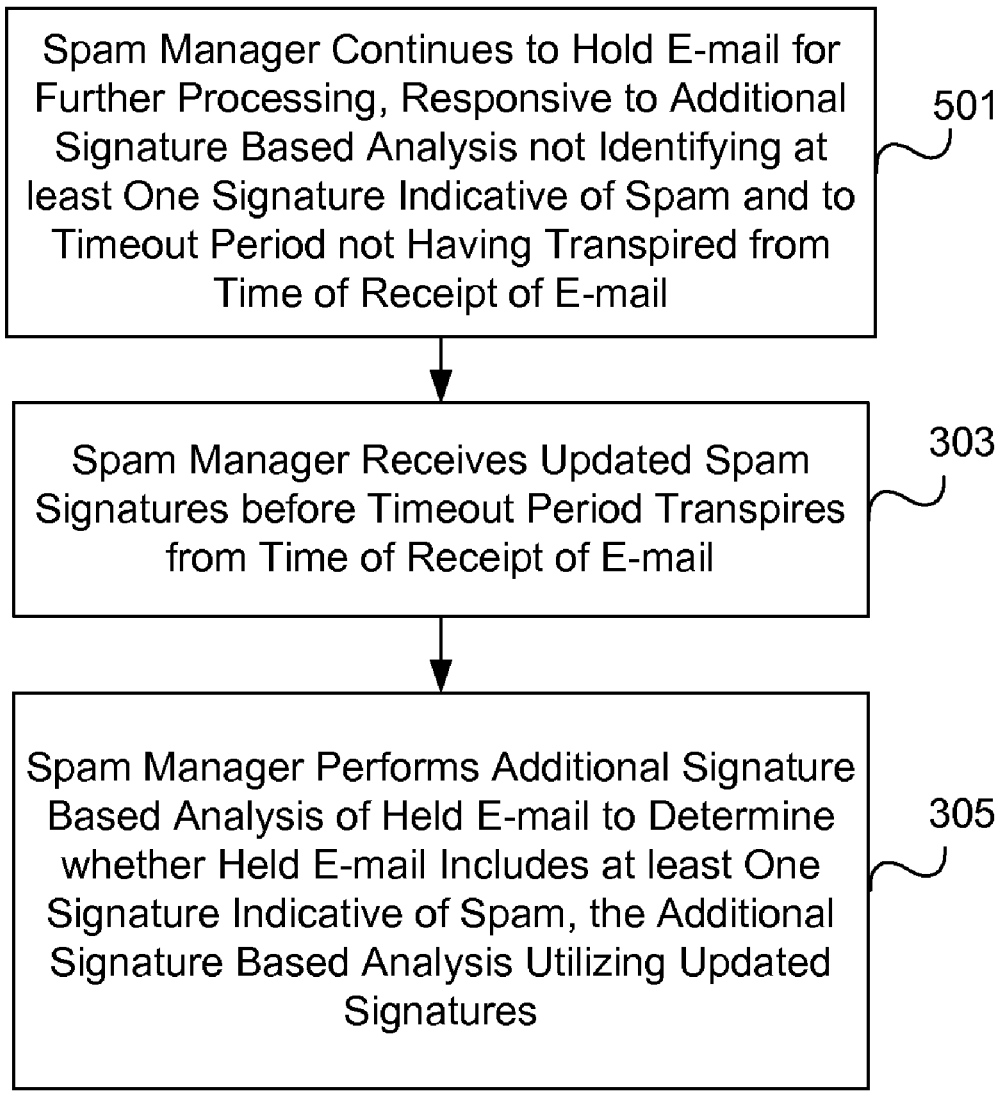
FIG. 6 is a flowchart illustrating additional steps that can be performed after the spam manager continues to hold e-mail for further processing, according to some embodiments of the present invention.

FIG. 6 illustrates additional steps that can be performed after the spam manager 101 continues 501 to hold the e-mail 106 for further processing according to the embodiment illustrated in FIG. 5. In some embodiments, the spam manager 101 subsequently receives 303 updated signatures 108 before the timeout period transpires. In these embodiments, the spam manager 101 performs 305 an additional signature based analysis utilizing the updated signatures 108. The spam manager 101 can then process the e-mail 106 as described above, based on the results of the additional signature based analysis.

Figure 7:
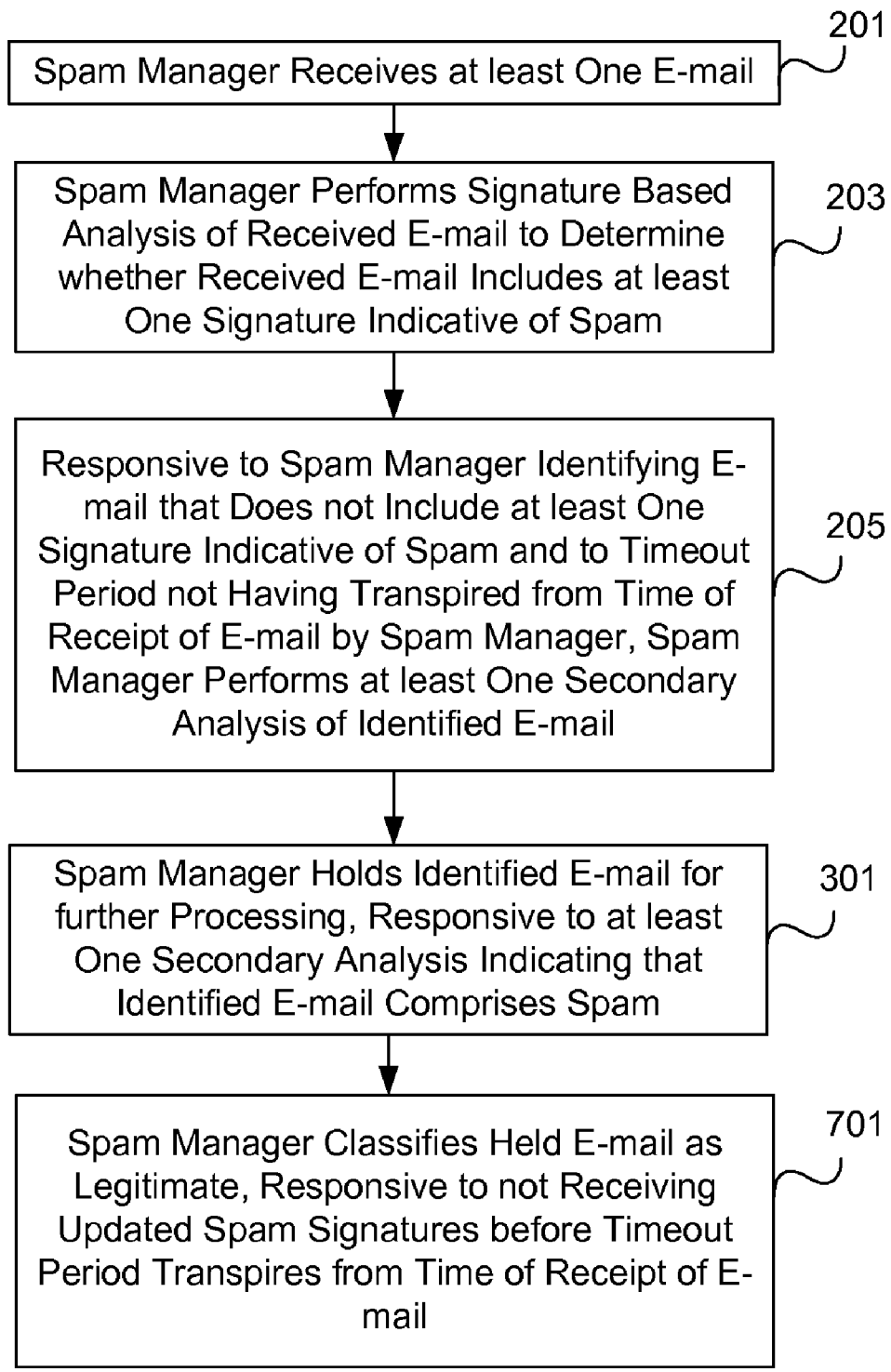
FIG. 7 is a flowchart illustrating steps for performing an embodiment of the present invention in which the spam manager classifies held e-mail as legitimate, responsive to not receiving updated signatures before the timeout period transpires.

Of course, sometimes the spam manager 101 holds 301 e-mail 106 for further processing as explained above in the context of FIG. 3, but does not receive updated signatures 108 before the timeout period transpires. As illustrated in FIG. 7, the spam manager 101 can classify 701 the held e-mail 106 as legitimate, responsive to not receiving updated signatures 108 before the timeout period transpires. In this instance, responsive to the timeout period having transpired without receiving updated signatures 108, the spam manager 101 can assume that its initial signature based analysis utilized the latest signatures. Recall that the initial signature based analysis classified the e-mail 106 as legitimate. Although the secondary analysis classified the e-mail 106 as spam, because of the false positive issues associated with secondary analysis techniques, the spam manager 101 relies on signature based analysis utilizing the latest signatures over the secondary analysis, and classifies 701 the e-mail 106 as legitimate.

Figure 8:
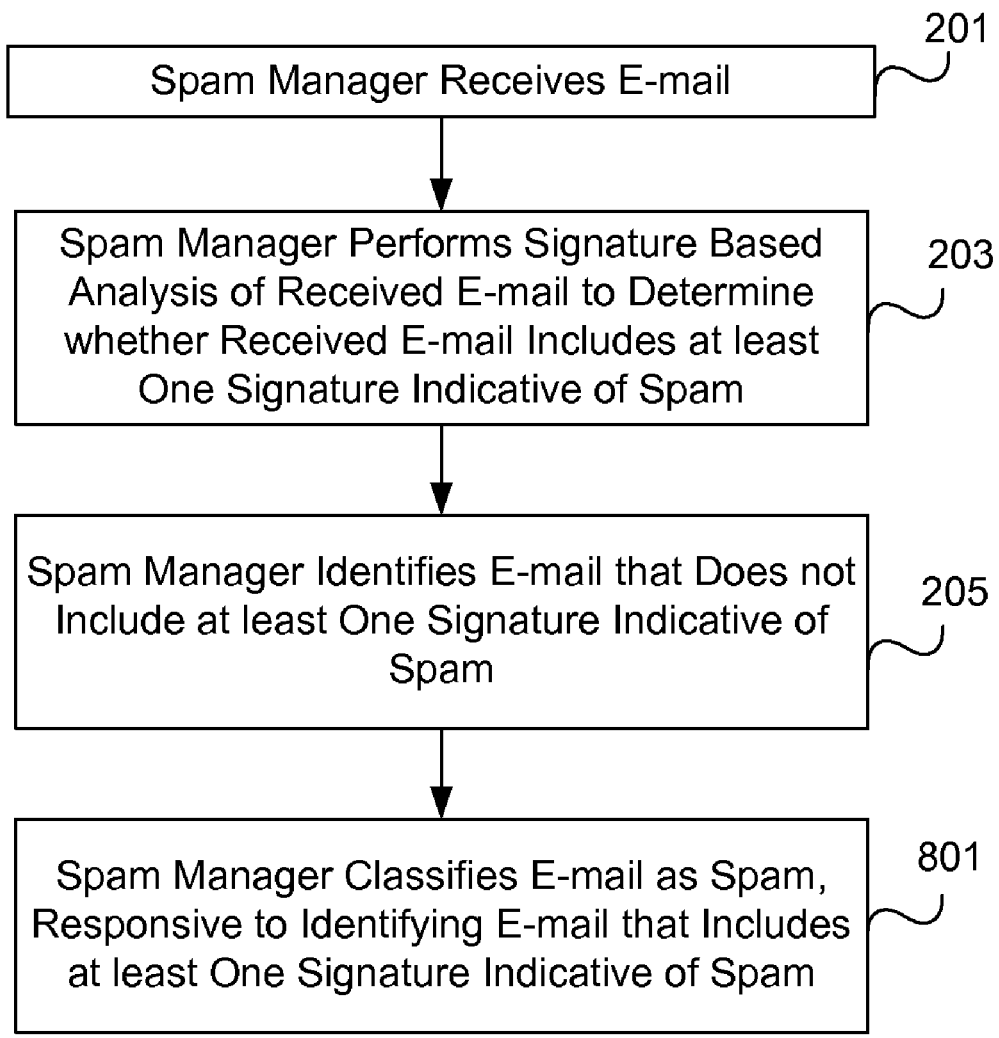
FIG. 8 is a flowchart illustrating steps for performing an embodiment of the present invention in which the initial signature based analysis identifies both legitimate e-mail and spam.
Figure 9:
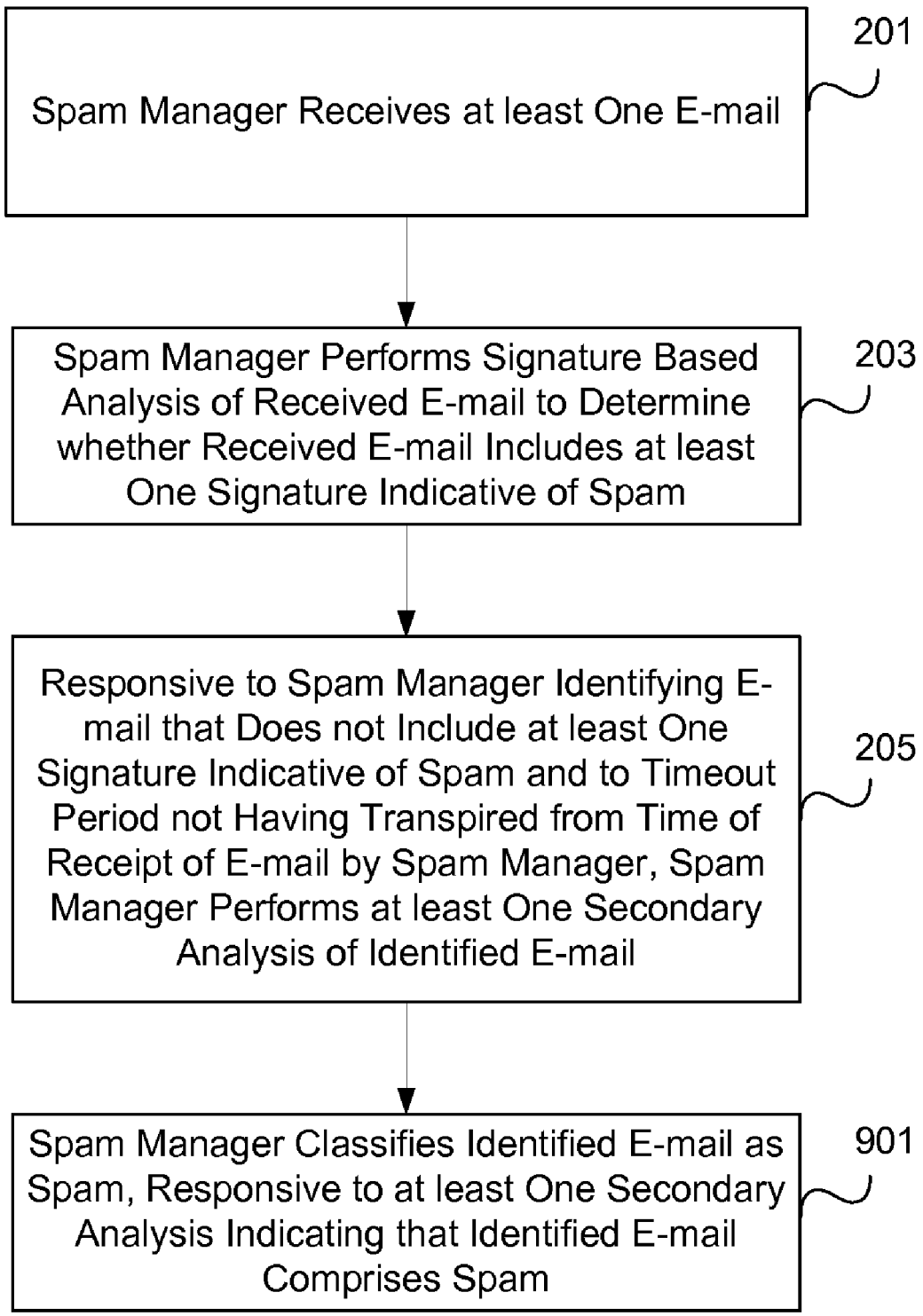
FIGS. 9-13 are flowcharts, illustrating steps for performing some embodiments of the present invention, in which the spam manager performs at least one secondary analysis which can indicate that identified e-mail either comprises spam, could comprise spam, or is legitimate.

Finally, FIG. 8 illustrates steps for performing an embodiment of the present invention in which the initial signature based analysis identifies both legitimate e-mail 106 and spam. As illustrated in FIG. 8, the spam manager 101 receives 201 e-mail 106, and performs 203 a signature based analysis thereof. The signature based analysis identifies e-mail 106 without signatures indicating spam, which can be processed as described above. Additionally, the signature based analysis identifies e-mail 106 including signatures indicative of spam, which the spam manager 101 classifies 801 as spam, without holding the e-mail 106 or performing a secondary analysis. Although it cannot be assumed that the signature analysis utilized the latest signatures, it is unnecessary to hold the e-mail 106, as it has already been identified as spam based on the signatures available. Furthermore, a secondary analysis is unnecessary, as the more accurate signature based analysis has already classified 801 the e-mail 106 as spam.

In some embodiments of the present invention, the spam manager 101 performs at least one secondary analysis which can indicate that identified e-mail 106 either comprises spam, could comprise spam, or is legitimate. The implementation mechanics for performing such a secondary analysis will be apparent to those of ordinary skill in the relevant art, in light of this specification. For example, the secondary analysis can be configured to yield a score indicating the likelihood that identified e-mail 106 comprises spam, and the spam manager 101 can interpret the score as indicating that e-mail 106 either comprises spam, could comprise spam, or is legitimate. In such embodiments, the secondary analysis only interprets e-mail 106 as comprising spam when the analysis is sufficiently definite such that further processing is deemed unnecessary (e.g., the score indicating the likelihood that identified e-mail 106 comprises spam is sufficiently high). Thus, in such embodiments, when the secondary analysis indicates that the e-mail 106 comprises spam, rather than processing the e-mail 106 further, the spam manager 101 simply classifies the e-mail 106 as spam. On the other hand, if the secondary analysis indicates that the e-mail 106 could comprise spam, the spam manager 101 holds the e-mail 106 for further processing. Finally, as with the embodiments described above, if no secondary analysis indicates that the e-mail 106 comprises spam, the spam manager 101 classifies the e-mail 106 as being legitimate.

FIGS. 9-13 illustrates steps for performing some embodiments of the present invention, in which the spam manager 101 performs at least one secondary analysis which can indicate that identified e-mail 106 either comprises spam, could comprise spam, or is legitimate. Turing to FIG. 9, as with the embodiment illustrated in FIG. 2, the spam manager 101 receives 201 at least one e-mail 106 addressed to the domain 103. The spam manager 101 proceeds to perform 203 signature based analysis of received e-mail 106 to determine whether received e-mail 106 includes at least one signature indicative of spam. Prior to the expiration of the timeout period, the signature based analysis identifies e-mail 106 without any signatures indicative of spam. In response, the spam manager 101 performs 205 at least one secondary analysis of the e-mail 106, in order to clarify whether the e-mail 106 is spam. In other embodiments, more than one secondary analysis can be performed, as desired. Responsive to at least one secondary analyses indicating that the e-mail 106 comprises spam, the spam manager 101 classifies 207 the e-mail 106 as spam. Although the signature based analysis did not necessarily utilize the most recent signatures, the spam manager 101 can safely classify 207 the e-mail 106 as being spam because the secondary analysis was sufficiently definite in its classification of the e-mail 106 as spam.

Figure 10:
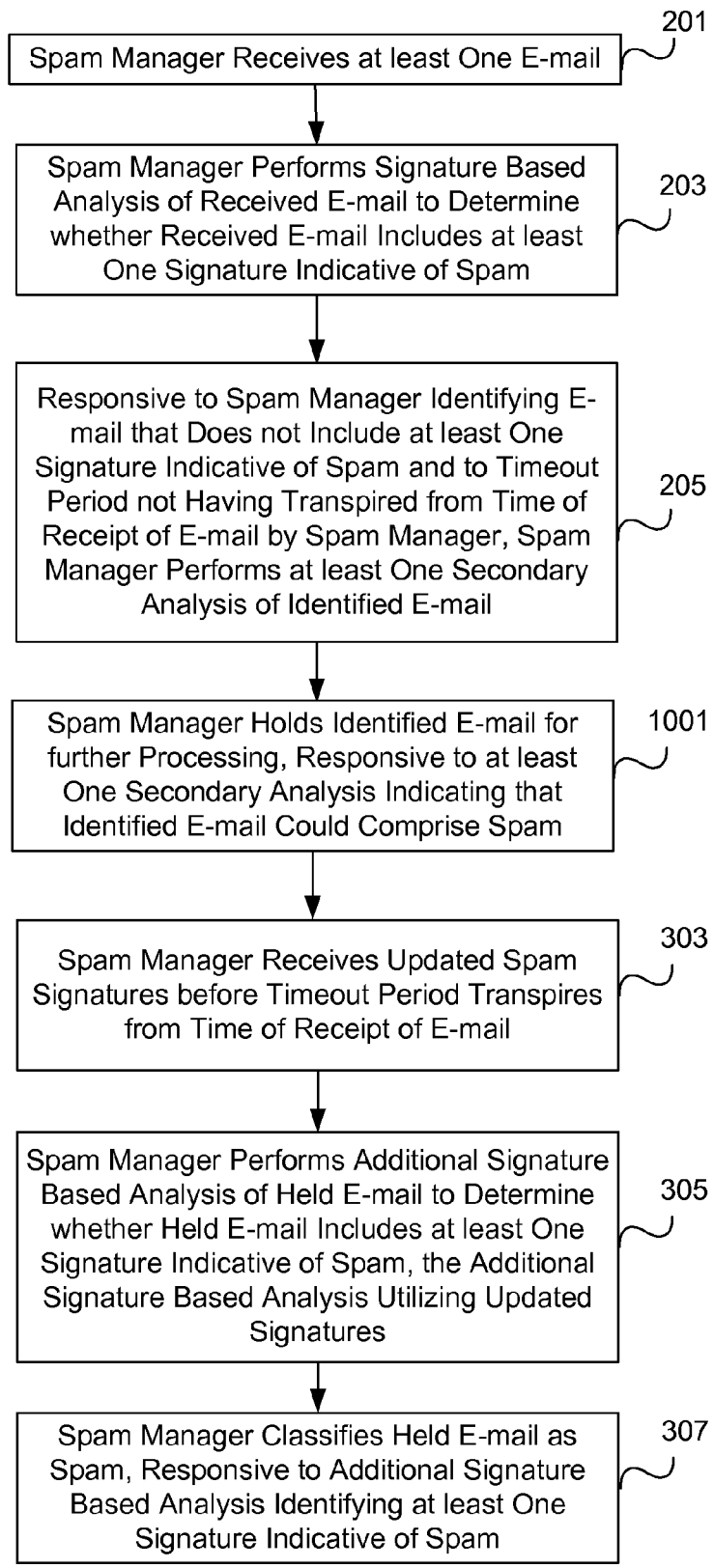

FIG. 10 illustrates steps for performing one embodiment of the present invention in which a secondary analysis indicates that e-mail 106 could comprises spam. As with the embodiment illustrated in FIG. 3, the spam manager 101 receives 201 e-mail 106, and performs 203 a signature based analysis thereon. Prior to the expiration of the timeout period, the signature based analysis identifies e-mail 106 without any signatures indicative of spam. In response, the spam manager 101 performs 205 at least one secondary analysis of the identified e-mail 106.

Responsive a secondary analysis indicating that the identified e-mail 106 could comprise spam, the spam manager 101 holds 1001 the identified e-mail 106 for further processing. In this instance, the signature based analysis indicated the e-mail 106 is legitimate, but the secondary analysis indicated that the e-mail 106 could comprise spam. Recall that signature based analysis is generally accurate, but this accuracy requires current signatures. Because the timeout period has not expired, the spam manager 101 cannot assume that the latest signatures were available for the signature based analysis. The secondary analysis indicated that the e-mail 106 could be spam, but was not definite in its classification. It is for these reasons that the spam manager 101 holds 1001 the e-mail 106, to see if updated signatures 108 will arrive before the expiration of the timeout period.

As with the embodiment illustrated in FIG. 3, the spam manager 101 receives 303 updated signatures 108 before the timeout period transpires. The spam manager 101 proceeds to perform 305 an additional signature based analysis of the identified e-mail 106 utilizing the updated signatures 108.

The next step depends upon the result of the additional signature based analysis. In the embodiment illustrated in FIG. 10, the additional signature based analysis identifies a signature indicative of spam within the e-mail 106, and in response to this identification classifies the e-mail 106 as spam.

Figure 11:
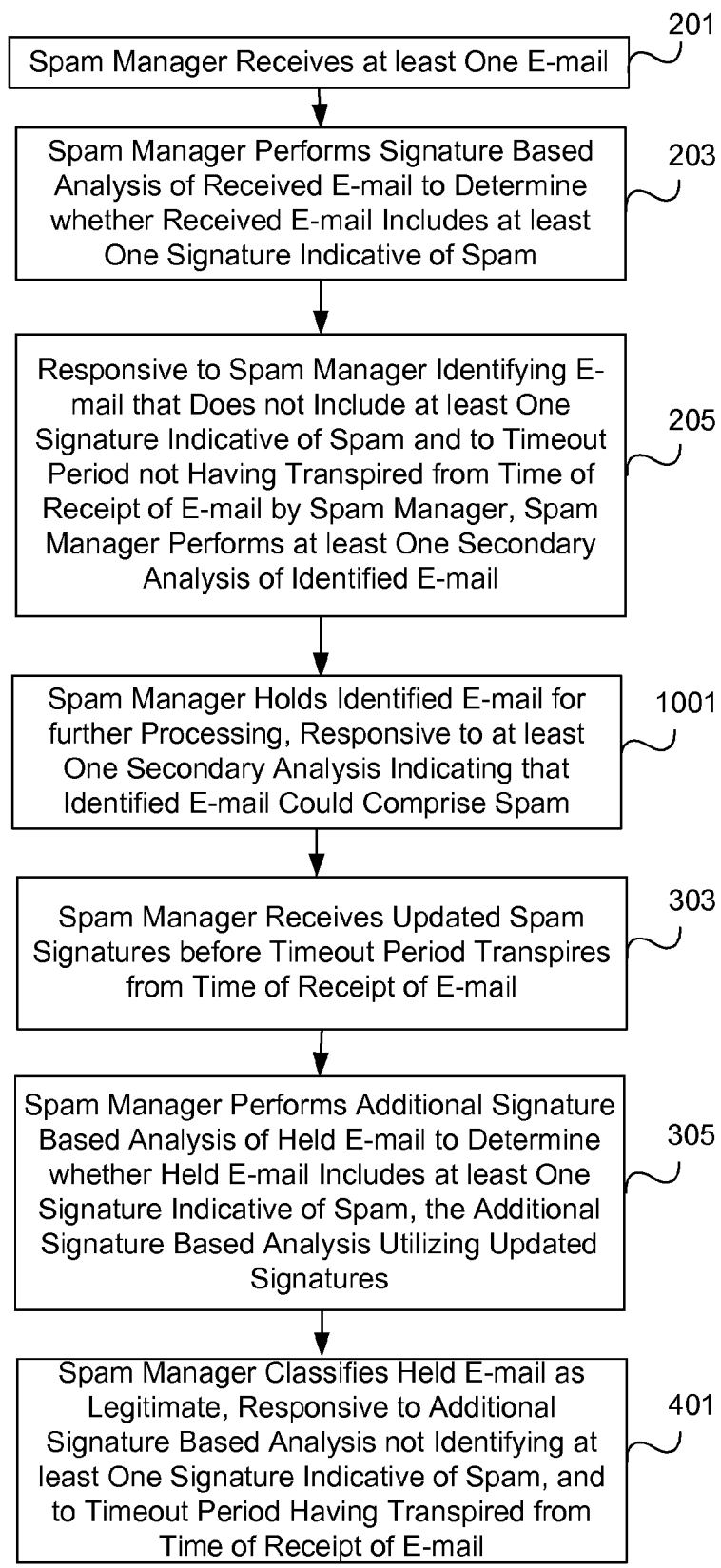
Figure 12:
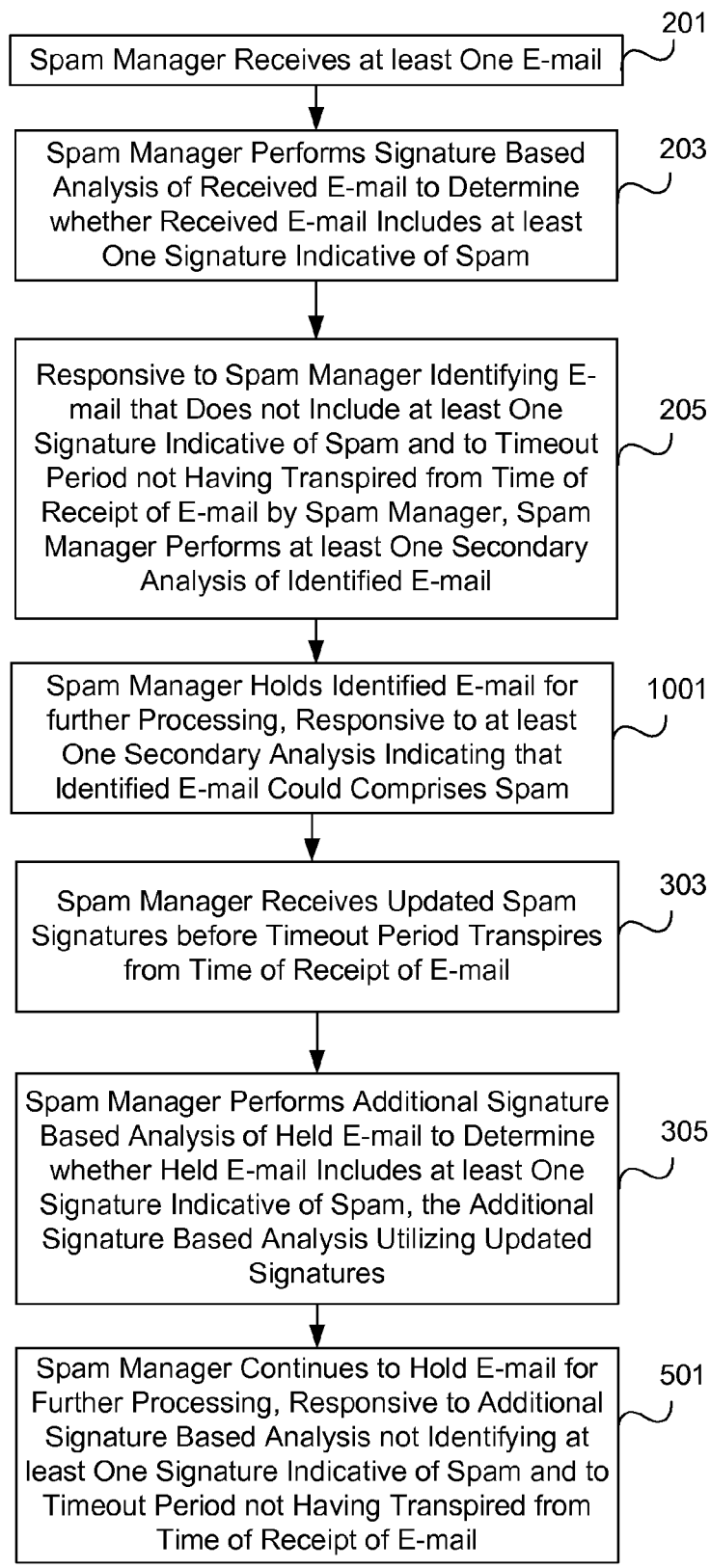

FIGS. 11-12 illustrate steps for performing other embodiments of the present invention, in which, as in the embodiment illustrated in FIG. 10, the signature based analysis identifies the e-mail 106 as legitimate, the secondary analysis indicates that the e-mail 106 could be spam, and the spam manager 101 receives 303 updated signatures 108 before the expiration of the timeout period and performs 305 an additional signature based analysis.

As with the embodiment of FIG. 10, the spam manager 101 receives 201 e-mail 106, and performs 203 a signature based analysis thereon. Prior to the expiration of the timeout period, the signature based analysis identifies e-mail 106 without any signatures indicative of spam. In response, the spam manager 101 performs 205 at least one secondary analysis of the identified e-mail 106. Responsive to a secondary analysis indicating that the identified e-mail 106 could comprise spam, the spam manager 101 holds 1001 the identified e-mail 106 for further processing. The spam manager 101 receives 303 updated signatures 108 before the timeout period transpires, and performs 305 an additional signature based analysis of the e-mail 106, utilizing the updated signatures 108.

In both the embodiments illustrated in FIGS. 11 and 12, the additional signature based analysis does not identify any signatures indicative of spam within the e-mail 106. The response depends upon whether the timeout period has transpired. As illustrated in FIG. 11, in that embodiment, responsive to the timeout period having transpired and the additional signature based analysis not identifying any signatures indicative of spam within the e-mail 106, the spam manager 101 classifies 401 the e-mail 106 as legitimate. Because of the expiration of the time period, it can be assumed that the additional signature based analysis utilized the latest signatures, yet the additional signature based analysis still classified the e-mail 106 as legitimate.

In the embodiment illustrated in FIG. 12, the timeout period has not transpired. Therefore, the spam manager 101 cannot assume that the additional secondary analysis utilized the latest signatures, and in response continues 501 to hold the e-mail 106 for further processing.

Figure 13:
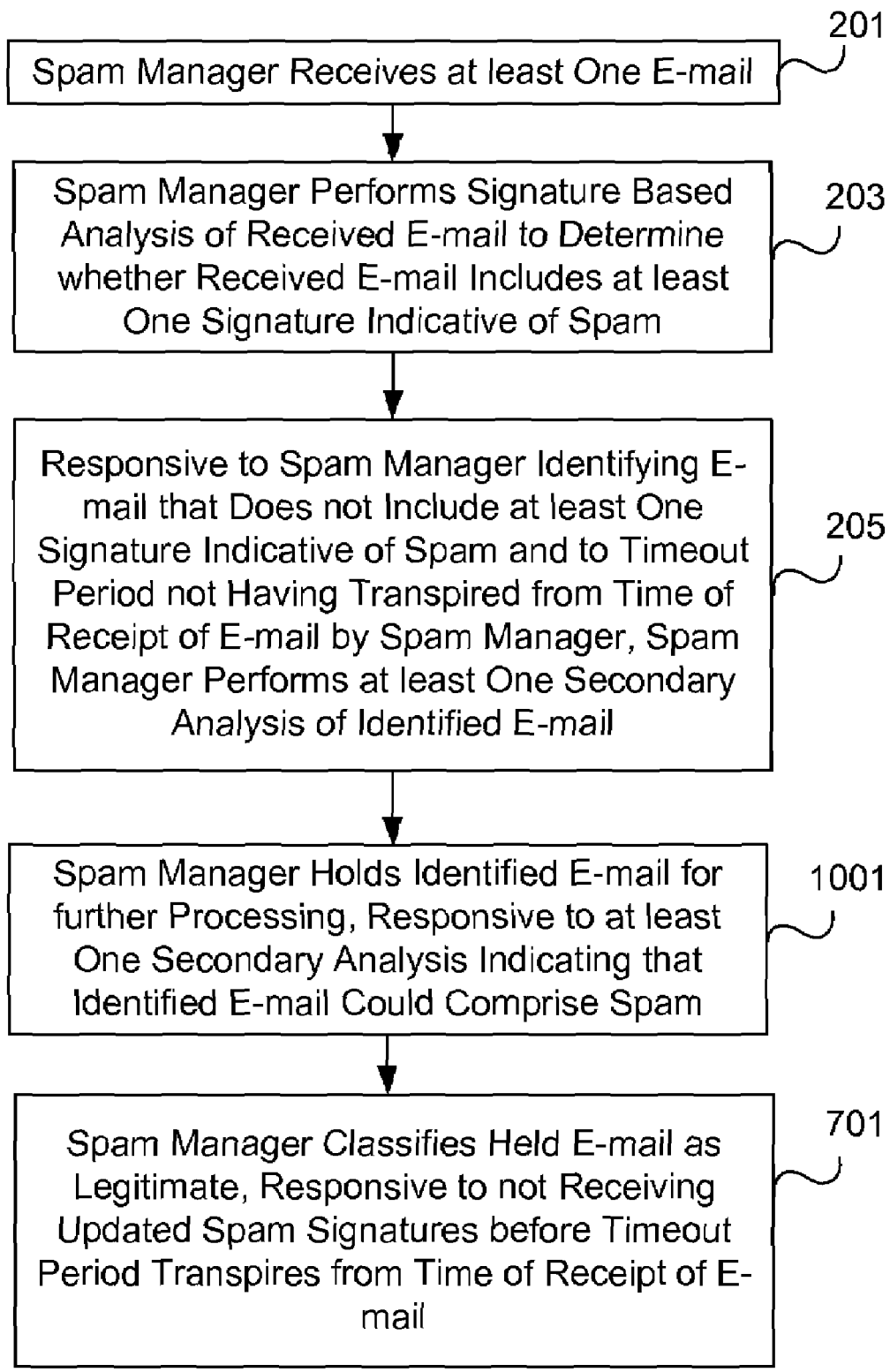

As with the embodiment illustrated in FIG. 7, sometimes the spam manager 101 holds 1001 e-mail 106 for further processing as explained above, but does not receive updated signatures 108 before the timeout period transpires. As illustrated in FIG. 13, the spam manager 101 can classify 701 the held e-mail 106 as legitimate, responsive to not receiving updated signatures 108 before the timeout period transpires. In this instance, responsive to the timeout period having transpired without receiving updated signatures 108, the spam manager 101 can assume that its initial signature based analysis utilized the latest signatures. Recall that the initial signature based analysis classified the e-mail 106 as legitimate. Although the secondary analysis classified the e-mail 106 as possibly being spam, because of the non-definiteness of that classification, the spam manager 101 relies on signature based analysis utilizing the latest signatures over the secondary analysis, and classifies 701 the e-mail 106 as legitimate.

Note that the present invention allows accurate detection of spam without the latency inherent in prior art signature based analysis. Because the spam manager 101 only holds 301 e-mail 106 that is identified as spam by a secondary analysis, a large percentage of e-mail 106 is not held at all, but processed in a timely fashion. However, the supplemental use of the secondary analysis in conjunction with signature based analysis ensures high accuracy of spam detection, without the false positive problems associated with prior art secondary analysis techniques.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer-implemented method for filtering spam and legitimate e-mail, the method comprising:

a spam manager executing on a computer and receiving an e-mail;

the spam manager performing a signature-based analysis of the e-mail to determine whether the e-mail includes at least one signature indicative of spam;

responsive to the spam manager determining that the e-mail does not include at least one signature indicative of spam and to a timeout period measured from a time of receipt of the e-mail by the spam manager having not transpired, the spam manager performing at least one secondary analysis of the e-mail;

the spam manager holding the e-mail for further processing, responsive to at least one secondary analysis failing to exclude that the e-mail comprises spam; and the spam manager classifying the held e-mail as legitimate, responsive to not receiving updated spam signatures before the timeout period transpires.

2. The method of claim 1, further comprising:
the spam manager classifying the e-mail as legitimate, responsive to no secondary analysis indicating that the e-mail comprises spam.

3. The method of claim 1, further comprising:
the spam manager classifying the e-mail as spam, responsive to at least one secondary analysis indicating that the e-mail comprises spam.

4. The method of claim 1, further comprising:
the spam manager classifying the e-mail as spam, responsive to the e-mail including at least one signature indicative of spam.

5. The method of claim 1, wherein at least one secondary analysis comprises a secondary analysis from a group consisting of:
a real-time black hole list analysis;
a neural network analysis; and
a Bayesian network analysis.

6. A computer-readable storage medium containing executable computer program code for performing a method of filtering spam and legitimate e-mail comprising:
a spam manager receiving an e-mail;
the spam manager performing a signature-based analysis of the e-mail to determine whether the e-mail includes at least one signature indicative of spam;
responsive to the spam manager determining that the e-mail does not include at least one signature indicative of spam and to a timeout period measured from a time of receipt of the e-mail by the spam manager having not transpired, the spam manager performing at least one secondary analysis of the e-mail;
the spam manager holding the e-mail for further processing, responsive to at least one secondary analysis failing to exclude that the e-mail comprises spam; and
the spam manager classifying the held e-mail as legitimate, responsive to not receiving updated spam signatures before the timeout period transpires.

7. The computer-readable storage medium of claim 6, wherein the medium further contains computer program code for performing the step:
the spam manager classifying the e-mail as legitimate, responsive to no secondary analysis indicating that the e-mail comprises spam.

8. The computer-readable storage medium of claim 6, wherein the medium further contains computer program code for performing the step:
the spam manager classifying the e-mail as spam, responsive to at least one secondary analysis indicating that the e-mail comprises spam.

9. The computer-readable storage medium of claim 6, wherein the medium further contains computer program code for performing the step:
the spam manager classifying the e-mail as spam, responsive to the e-mail including at least one signature indicative of spam.

10. The computer-readable storage medium of claim 6, wherein at least one secondary analysis comprises a secondary analysis from a group consisting of:
a real-time black hole list analysis;
a neural network analysis; and
a Bayesian network analysis.

11. A computer for filtering spam and legitimate e-mail, comprising:
a computer-readable storage medium containing executable computer program code for performing a method comprising:
a spam manager receiving an e-mail;
the spam manager performing a signature-based analysis of the e-mail to determine whether the e-mail includes at least one signature indicative of spam;
responsive to the spam manager determining that the e-mail does not include at least one signature indicative of spam and to a timeout period measured from a time of receipt of the e-mail by the spam manager having not transpired, the spam manager performing at least one secondary analysis of the e-mail;
the spam manager holding the e-mail for further processing, responsive to at least one secondary analysis failing to exclude that the e-mail comprises spam; and
the spam manager classifying the held e-mail as legitimate, responsive to not receiving updated spam signatures before the timeout period transpires.

12. The computer of claim 11, wherein the medium further contains computer program code for performing the step:
the spam manager classifying the e-mail as legitimate, responsive to no secondary analysis indicating that the e-mail comprises spam.

13. The computer of claim 11, wherein the medium further contains computer program code for performing the step:
the spam manager classifying the e-mail as spam, responsive to at least one secondary analysis indicating that the e-mail comprises spam.

14. The computer of claim 11, wherein the medium further contains computer program code for performing the step:
the spam manager classifying the e-mail as spam, responsive to the e-mail including at least one signature indicative of spam.

15. The computer of claim 11, wherein at least one secondary analysis comprises a secondary analysis from a group consisting of:
a real-time black hole list analysis;
a neural network analysis; and
a Bayesian network analysis.

* * * * *